United States Patent

[11] 3,625,961

| [72] | Inventor | Nicola Maggi<br>Cusano Milan, Italy |
|---|---|---|
| [21] | Appl. No. | 702,796 |
| [22] | Filed | Feb. 5, 1968 |
| [45] | Patented | Dec. 7, 1971 |
| [73] | Assignee | Lepetit S.p.A. Gruppo per la Ricerca<br>Scientifica e la Produzione Chimica<br>Farmaceutica<br>Milan, Italy |
| [32] | Priority | Mar. 1, 1967 |
| [33] | | Great Britain |
| [31] | | 9,755/67 |

[54] RIFAMYCINS
6 Claims, No Drawings

[52] U.S. Cl.................................................. 260/239.3 P,
424/274

[51] Int. Cl........................................................ C07d 41/00
[50] Field of Search............................................260/239.3 P

[56]  References Cited
UNITED STATES PATENTS 3,349,082  10/1967  Maggi et al. ..................  260/239.3

*Primary Examiner*—Henry R. Jiles
*Assistant Examiner*—Robert T. Bond
*Attorney*—Joseph Hirschmann ABSTRACT: The invention is concerned with new pyrrolo-rifamycins, and a process for preparing the same starting from rifamycin S and an unsaturated amine carbonyl compound. The substances are highly active as antibacterials and are particularly fit for topical use, being generally of light yellow color.

RIFAMYCINS

This invention is concerned with a new class of compounds and with a method for preparing them. More particularly the compounds of the invention are derivatives of rifamycin SV, having the following general formula:

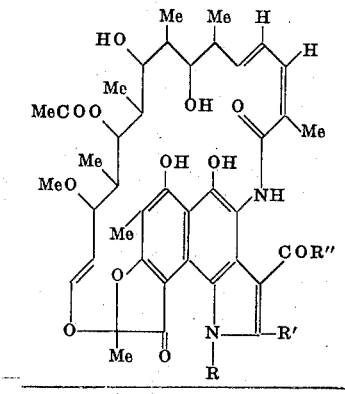

wherein R is hydrogen or a lower alkyl, lower hydroxyalkyl, aralkyl or aryl group, R' is hydrogen or lower alkyl, and R'' is hydrogen, hydroxy, lower alkyl, lower alkoxy, amino, substituted amino group.

The process for preparing the new class of compounds consists in contacting the rifamycin S of the formula:

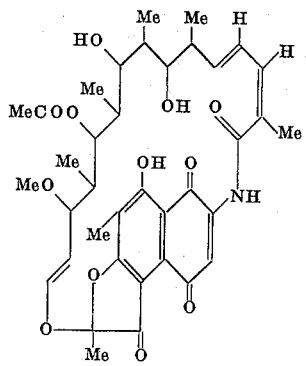

with an amount at least equimolecular of a compound of the general formula:

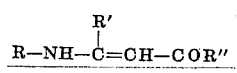

wherein R, R', R'' have the above significance. The reaction is carried out in an organic inert solvent at room temperature for a period of time of 7 to 20 hours.

The new rifamycins are generally well crystallized substances and show a better stability in the time than the other rifamycins and are much lighter in color than the parent compounds, being straw to amber yellow. As a rule they do not have a well defined melting point and decompose above 150° C.

They are soluble in chloroform, methanol, ethanol and many other usual organic solvents, and sparingly soluble in water at pH close to neutrality.

Rifamycin derivatives having an amino methyl substituent in position 3 are described in U.S. Pat. No. 3,349,082. In this case no heterocyclic nucleus is fused in with the aromatic moiety of the antibiotic.

The compounds of the invention show a high degree of antibacterial activity in vitro, as it is apparent from table 1, in which the minimal inhibitory concentration in $\mu g./ml.$, against several pathogenic organism, is given.

The experiments in vivo confirmed the excellent antibiotic properties. In this connection the $ED_{50}$ in mice, with experimental infection induced by Staphylococcus aureus, have been recorded in table 1.

For therapeutical purposes the substances can be administered both by systemic and topical route, although this latter route may be preferred, as said above, because of the light color. The diseases which are usefully treated in general those caused by pathogenic micro-organisms, i.e., infectious diseases, such as pneumonia, abscess, phlegmon, furuncles,

TABLE 1

| Compound | | | Minimal inhibitory concentration (-g./ml.) | | | | | | | | $E.D._{50}$ (mg./kg.) | |
|---|---|---|---|---|---|---|---|---|---|---|---|---|
| R | R' | R'' | S. aureus | S. faecal. | S. haemol. | B. subtil. | Prot. vulga. | E. coli | Klebs. pneum. | Pseudom. aerug. | M. tuberc. $H_{37}R_v$ | Per os | Subcutaneous |
| $CH_3$ | $CH_3$ | $OCH_3$ | 0.005 | 0.1 | 0.2 | 0.2 | 10 | 5 | 25 | 50 | 1 | 1.63 | 0.81 |
| H | $CH_3$ | $OC_3H_5$ | 0.02 | 0.1 | 0.5 | 0.8 | 10 | 5 | 25 | 100 | 2 | 1.62 | 1.42 |
| $CH_3$ | $CH_3$ | $N(CH_3)_3$ | 0.05 | 0.2 | 0.5 | 1 | 10 | 5 | 25 | 50 | 5 | 12–14 | ~4 |
| $CH_3$ | $CH_3$ | $OC_3H_5$ | 0.005 | 0.2 | 0.5 | 0.1 | 5 | 10 | 25 | 20 | 0.5 | 3.25 | 2.14 |
| n-$C_3H_7$ | $CH_3$ | $OC(CH_3)_3$ | 0.02 | 0.3 | 1 | 0.8 | >100 | 10 | 50 | 50 | 0.5 | >8 | 8 |
| $CH_3$ | $CH_3$ | $OC(CH_3)_3$ | 0.02 | 0.1 | 0.5 | 0.6 | 10 | 20 | 25 | 20 | 5 | 2.30 | 4.92 |
| H | $CH_3$ | $OCH_3$ | 0.01 | 0.2 | 0.2 | 0.7 | 2 | 5 | 25 | 50 | 0.2 | <1 | <1 |
| $CH_3$ | n-$C_3H_7$ | $OC_3H_5$ | 0.01 | 0.3 | 0.2 | 0.6 | 2 | 5 | 25 | 20 | 0.5 | 5.66 | 4.93 |
| $C_3H_5$ | $CH_3$ | $OCH_3$ | 0.02 | 0.4 | 0.5 | 0.4 | 5 | 5 | 25 | 50 | 0.5 | 3.25 | 2.83 |
| $CH_3$ | $CH_3$ | $NHC_6H_5$ | 0.2 | 3 | 1 | 1.2 | 50 | 20 | 100 | >100 | 1 | ~14 | ~14 | otite, osteomyelitis, cystitis, cholecystitis, liver infections and so on.

The pharmaceutical compositions, of which examples are given hereinafter, may contain unit doses of 50 to 500 mg. of the substances. According to the selected way of administration, the substances may be filled into capsules or incorporated in tablets and suppositories; or alternatively they may be suspended to form syrups or suspensions to be employed as drops. When the topical administration is preferred, either aqueous suspensions or ointments may be applied, in which the concentration of the active ingredient may vary within broad limits, e.g. between 0.5 and 10 percent.

The following nonlimitative examples illustrate the process and products of the present invention.

EXAMPLE 1

Preparation of 1',2'-dimethyl-3'-carbomethoxypyrrole-[3,2-c]-4-deoxyrifamycin SV.

To a suspension of 1.4 g. (0.0020 mole) of rifamycin S in 16 ml. of methanol, 0.300 g. (0.0023 mole) of methyl 3-methylamino-crotonate, dissolved in 4 ml. of methanol, are added. The suspension is stirred for some minutes until solution is complete. After standing at room temperature for 15 hours, the solution is concentrated to half volume in vacuo. Bulky crystals soon precipitate, and the precipitation is complete after cooling the solution at 4°–5° C. for 24 hours. The citrine crystals of the final compound are filtered, washed with a small amount of cold methanol, and dried at 45° C. in vacuo. Yield 1.23 g. (75 percent). M.p. 210°–212° C. (decomposition). $C_{43}H_{54}N_2O_{13}$ (m.w. 806.92). Analysis: calcd. C 64.00 H 6.75 N 3.47; found C 63.60 H 6.81 N 3.39.

Absorption Spectra $\lambda$ max. = 238 m$\mu$     $E_{1\,cm.} = 488$
$\lambda$ max. = 270 m$\mu$     $E_{1\,cm.} = 377$
$\lambda$ max. = 311 m$\mu$     $E_{1\,cm.} = 390$
$\lambda$ max. = 425 m$\mu$     $E_{1\,cm.} = 147$ Thin Layer Chromatography-Silica-gel G + 3 percent citric acid; acetone:chloroform = 1:1; $R_f$ 0.7 (yellow spot).

acetone:chloroform = 1:1, $R_f \approx 0.55$ (citrine spot).

TABLE 2

| Compound | | | | | Elemental analysis | | | | | |
|---|---|---|---|---|---|---|---|---|---|---|
| | | | | M.P.° C. | Calculated | | | Found | | |
| R | R' | R'' | Formula | (decomposition) | C | H | N | C | H | N |
| Example: | | | | | | | | | | |
| 4 | $CH_3$ | $CH_3$ | $OC_2H_5$ | $C_{44}H_{56}N_2O_{13}$ | 169–172 | 64.37 | 6.88 | 3.41 | 64.60 | 6.84 | 3.20 |
| 5 | n-$C_3H_7$ | $CH_3$ | Same | $C_{46}H_{60}N_2O_{13}$ | 202–205 | 65.08 | 7.12 | 3.30 | 64.50 | 6.99 | 3.50 |
| 6 | $CH_3$ | $CH_3$ | $OC(CH_3)_3$ | $C_{46}H_{60}N_2O_{13}$ | 225–228 | 65.08 | 7.12 | 3.30 | 64.63 | 7.18 | 3.36 |
| 7 | H | $CH_3$ | $OCH_3$ | $C_{42}H_{52}N_2O_{13}$ | 179–181 | 63.62 | 6.61 | 3.53 | 62.40 | 6.80 | 3.68 |
| 8 | $CH_3$ | n-$C_3H_7$ | $OC_2H_5$ | $C_{46}H_{60}N_2O_{13}$ | 200–104 | 65.08 | 7.12 | 3.30 | 64.80 | 7.40 | 3.27 |
| 9 | $C_2H_5$ | $CH_3$ | $OCH_3$ | $C_{44}H_{56}N_2O_{13}$ | 204–210 | 64.37 | 6.87 | 3.41 | 63.68 | 7.17 | 3.07 |
| 10 | $CH_3$ | $CH_3$ | $NHC_6H_5$ | $C_{48}H_{57}N_3O_{12}$ | 190–200 | 66.42 | 6.62 | 4.84 | 65.78 | 6.78 | 4.49 |
| 11 | n-$C_3H_7$ | $CH_3$ | $CH_3$ | $C_{45}H_{58}N_2O_{12}$ | 186–188 | 66.00 | 7.14 | 3.42 | 65.69 | 7.28 | 3.60 |
| 12 | $CH_3$ | $CH_3$ | $CH_3$ | $C_{43}H_{54}N_2O_{12}$ | 255–256 | 65.29 | 6.89 | 3.54 | 65.22 | 6.92 | 3.70 |
| 13 | $C_6H_5$ | $CH_3$ | $CH_3$ | $C_{48}H_{56}N_2O_{12}$ | 210–215 | 67.59 | 6.61 | 3.28 | 67.51 | 6.52 | 3.60 |
| 14 | $C_6H_5CH_2$ | $CH_3$ | $CH_3$ | $C_{49}H_{58}N_2O_{12}$ | 183 185 | 67.88 | 6.74 | 3.23 | 67.79 | 6.36 | 3.59 |
| 15 | $HOC_2H_4$ | $CH_3$ | $CH_3$ | $C_{44}H_{56}N_2O_{13}$ | 214–218 | 64.37 | 6.88 | 3.41 | 64.49 | 6.80 | 3.30 |

EXAMPLE 2

Preparation of 2'-methyl-3'-carbethoxypyrrole-[3,2-c]-4-deoxyrifamycin SV.

To 7.0 g. (0.010 mole) of rifamycin S suspended in 125 ml. of methanol a solution of 2.0 g. (0.015 mole) of ethyl-3-amino-crotonate in 20 ml. of methanol are added with stirring, until the solution is complete. After standing at 20°–22° C. for 70 hours, the solution is concentrated to one-fourth of its volume. The liquid is poured, while stirring, into 350 ml. of a 2 percent aqueous solution of ascorbic acid, so as to convert rifamycin S, which might be still present, into the corresponding reduced form i.e., the rifamycin SV. The pH is adjusted to 2–3 and the rifamycins are extracted with 400 ml. of ethyl acetate. The organic phase is rendered anhydrous with the aid of powdered sodium sulfate, concentrated to dryness in vacuo, and the residue is taken up in 10 ml. of chloroform. The solution is chromatographed on a column of silica-gel and eluted with a mixture of chloroform-ethanol = 9:1. The first 100 ml. colored fraction is discarded, while the next three fractions of 100 ml. each, are combined and evaporated to dryness. The residue is dissolved in 30–35 ml. of methanol. From this solution cooled at 0°–5° C. for 2–3 hours, the final compound precipitates, as light amber colored crystals, which are collected, washed with methanol and dried in vacuo at 40°–45° C. Yield 4.2 g. (52 percent). M.p. 162°–166° dec.).
$C_{43}H_{54}N_2O_{13}$ (m.w. 806.92). Analysis: calcd.
C 64.00—H 6.75—N 3.47; found C 63.38—H 6.66—N 3.60

Absorption Spectra $\lambda$ max. = 232 m$\mu$   $E_{1cm}^{1\%} = 559$
$\lambda$ max. = 310 m$\mu$   $E_{1cm}^{1\%} = 334$
$\lambda$ max. = 422 m$\mu$   $E_{1cm}^{1\%} = 147$ T.L.C. Silica-gel G; acetone:chloroform = 1:1; $R_f \approx 0.4$ (yellow spot)

EXAMPLE 3

Preparation of 1',2'-dimethyl-3'-dimethylcarbemylpyrole-[3,2-c]-4-deoxyrifamycin SV.

To a suspension of 1.6 g. (0.002 mole) of rifamycin S in 25 ml. of methanol, 0.370 g. (0.0028 mole) of dimethylamide of the 3-methylamino-crotonic acid, dissolved in 5 ml. of methanol, are added with stirring until the solution is complete. The solution is allowed to stand at 20°–22° C. for 26 hours, then is concentrated to about 20 ml. in vacuo. On standing overnight at about 5° C., light yellow crystals of the end compound precipitate, and these are collected, washed with methanol and dried in vacuo at 40°–45° C. Yield 1.58 g. (80.0 percent). M.p. 183°–188° C. (dec.). $C_{44}H_{57}N_3O_{12}$ (m.w. 819.96).
Analysis: calcd. C 64.45—H 7.01—N 5.12; found C 63.93—H 7.10—N 5.20.

Absorption spectra $\lambda$ max. = 242 m$\mu$   $E_{1cm}^{1\%} = 445$
$\lambda$ max. = 310 m$\mu$   $E_{1cm}^{1\%} = 344$
$\lambda$ max. = 425 m$\mu$   $E_{1cm}^{1\%} = 151$ T.L.C. Silica-gel G + 3 percent citric acid;

EXAMPLES 4 to 15

By a process substantially identical with the ones described in examples 1 to 3, the compounds listed in table 2 were prepared.

TABLE 3

| | U.V. absorption spectra | |
|---|---|---|
| | $\lambda_{max.}$ | E 1%/1 cm. |
| Example: | | |
| 4 | 238 | 487 |
| | 270 | 358 |
| | 310 | 282 |
| | 425 | 150 |
| 5 | 238 | 479 |
| | 270 | 356 |
| | 310 | 378 |
| | 425 | 151 |
| | 240 | 452 |
| 6 | 310 | 352 |
| | 425 | 139 |
| 7 | 233 | 565 |
| | 310 | 364 |
| | 423 | 135 |
| 8 | 269 | 347 |
| | 309 | 375 |
| | 425 | 141 |
| 9 | 310 | 390 |
| | 425 | 157 |
| 10 | 310 | 362 |
| | 425 | 139 |
| 13 | 240 | 450 |
| | 270 | 362 |
| | 307 | 360 |
| | 428 | 157 |
| 14 | 240 | 153 |
| | 278 | 301 |
| | 311 | 370 |
| | 428 | 153 |
| 15 | 240 | 495 |
| | 276 | 312 |
| | 311 | 397 |
| | 428 | 165 |

EXAMPLE 16

A capsule is prepared by filling into the capsule

| | |
|---|---|
| 1',2'-Dimethyl-3'-carboxymethyl-pyrrole-[3,2-c]-4-deoxyrifamycin SV | 100 mg. |
| Talc | 25 mg. |

EXAMPLE 17

A tablet is prepared from

| | |
|---|---|
| 2'-Methyl-3'-carbethoxypyrrole-[3,2-c]-4-deoxyrifamycin SV | 200 mg. |
| Magnesium stearate | 1 mg. |
| Talc | 15 mg. |
| Starch | 50 mg. |
| Stearic acid | 4 mg. |

EXAMPLE 18

A suppository is prepared by incorporating 200 mg. of 1',2'-dimethyl-3'-dimethylcarbamylpyrrole-[3,2-c]-4-deoxyrifamycin SV into a suppository mass.

EXAMPLE 19

A dermatologic ointment is prepared from:

| | |
|---|---|
| 1',2'-Dimethyl-3'-carbethoxypyrrole-[3,2-c]-4-deoxyrifamycin SV | 0.5 g. |
| sodium bisulfite | 0.1 g. |
| propylene glycol | 14.0 g. |
| sodium ascorbate | 0.56 g. |
| polyethylene glycol 4000 | 30.0 g. |
| polyethylene glycol 400 | 54.840 g. |

EXAMPLE 20

An ointment for ophthalmic use is prepared from:

| | |
|---|---|
| 1'-Methyl-2'-propyl-3'-carbethoxypyrrole-[3,2-c]-4-deoxyrifamycin SV | 1.0 g. |
| sodium ascorbate | 0.05 g. |
| vaseline | 80.0 g. |
| Vaseline oil | 19.450 g. |

I claim:

1. A rifamycin SV derivative of the formula

[Structure of rifamycin SV derivative with substituents R, R', COR'']

wherein R is selected from the class consisting of hydrogen, lower alkyl of one to three carbon atoms, hydroxyethyl, phenyl and benzyl, R' is lower alkyl with one to three carbon atoms, and R'' is selected from the class consisting of methyl, lower alkoxy with one to four carbon atoms, dimethylamino and anilino.

2. A compound as in claim 1, in which the rifamycin SV derivative is 1',2'-dimethyl-3'-carbomethoxypyrrole-[3,2-c]-4-deoxyrifamycin.

3. A compound as in claim 1, in which the rifamycin SV derivative is 2'-methyl-3'-carbethoxypyrrole-[3,2-c]-4-deoxyrifamycin.

4. A compound as in claim 1, in which the rifamycin SV derivative is 1',2'-dimethyl-3'-dimethylcarbamylpyrrole-[3,2-c]-4-deoxyrifamycin.

5. A compound as in claim 1, in which the rifamycin SV derivative is 1',2'-dimethyl-3'-carbethoxypyrrole-[3,2-c]-4-deoxyrifamycin.

6. A process for preparing a rifamycin SV derivative of the formula:

[Structure of rifamycin SV derivative with substituents R, R', COR'']

wherein R is selected from the class consisting of hydrogen, lower alkyl of one to three carbon atoms, hydroxyethyl, phenyl and benzyl, R' is lower alkyl with one to three carbon atoms, and R'' is selected from the class consisting of methyl, lower alkoxy with one to four carbon atoms, dimethylamino and anilino, which comprises contacting rifamycin S with an amount at least equimolecular of a compound of the general formula $$R-NH-\overset{R'}{\underset{}{C}}=CH-COR''$$

wherein R, R' and R'' have the above significance, in an organic solvent at room temperature for a period of time of 7 to 70 hours.

* * * * *